US010255328B2

(12) United States Patent
Hassan et al.

(10) Patent No.: US 10,255,328 B2
(45) Date of Patent: Apr. 9, 2019

(54) LOCATION SOURCE RANKING FOR DETERMINING DEVICE LOCATION

(71) Applicant: Microsoft Technology Licensing, LLC, Redmond, WA (US)

(72) Inventors: Amer A. Hassan, Kirkland, WA (US); Neil A. Deason, Kirkland, WA (US); Carl S. Olivier, Esher (GB); Roy D. Kuntz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/050,187

(22) Filed: Oct. 9, 2013

(65) Prior Publication Data

US 2015/0100589 A1  Apr. 9, 2015

(51) Int. Cl.
*G06F 17/30* (2006.01)
*H04W 4/02* (2018.01)
*H04W 4/90* (2018.01)

(52) U.S. Cl.
CPC .......... *G06F 17/3053* (2013.01); *H04W 4/02* (2013.01); *H04W 4/90* (2018.02)

(58) Field of Classification Search
CPC .......... G06F 17/3053; G06F 17/30864; G06F 17/30867

(Continued)

(56) References Cited

U.S. PATENT DOCUMENTS 6,075,515 A * 6/2000 Keyson ............... G06F 3/016
345/156
7,668,925 B1 * 2/2010 Liao ................... H04L 45/00
370/397

(Continued)

FOREIGN PATENT DOCUMENTS

CN  1607399 A   4/2005
CN  102761959 A  10/2012

(Continued)

OTHER PUBLICATIONS

"International Search Report and Written Opinion", Application No. PCT/US14/59378, dated Apr. 6, 2015, 7 pages.

(Continued)

*Primary Examiner* — Shahid A Alam
(74) *Attorney, Agent, or Firm* — Schwegman Lundberg & Woessner, P.A.

(57) ABSTRACT

Techniques for location source ranking for determining device location are described. A location source generally refers to a source of position information (e.g., GPS coordinates, latitude and longitude, street addresses, and so forth) that can be used to determine a geographical location of a device. According to one or more embodiments, location sources and/or combinations of location sources can be ranked based on various criteria. Thus, when a location is requested for a particular device, a highest ranking available location source or combination of location sources can be selected to determine a location of the device. Location source rankings, for instance, can be maintained on a client device and/or via a remote location-related service. According to various embodiments, a location of a device can be determined to enable emergency assistance to be provided at the location.

20 Claims, 10 Drawing Sheets

(58) Field of Classification Search
USPC .......................................................... 707/748
See application file for complete search history.

(56) References Cited

U.S. PATENT DOCUMENTS

| | | | |
|---|---|---|---|
| 7,961,717 | B2 | 6/2011 | Lee et al. |
| 8,086,398 | B2 | 12/2011 | Sanchez et al. |
| 8,463,285 | B2* | 6/2013 | MacNaughtan ...... G01S 5/0252 340/539.13 |
| 8,825,078 | B1* | 9/2014 | Mishra ........................ 455/456.1 |
| 2002/0145984 | A1* | 10/2002 | Babu ...................... H04L 29/06 370/312 |
| 2005/0020210 | A1 | 1/2005 | Krumm et al. |
| 2006/0004797 | A1* | 1/2006 | Riise ................... G06F 17/3087 707/804 |
| 2007/0185980 | A1 | 8/2007 | Abraham et al. |
| 2009/0100007 | A1* | 4/2009 | Campbell ........... G06F 17/3087 707/702 |
| 2009/0163228 | A1 | 6/2009 | Blumberg et al. |
| 2010/0291947 | A1* | 11/2010 | Annamalai ................. 455/456.1 |
| 2013/0176883 | A1 | 7/2013 | Han et al. |

FOREIGN PATENT DOCUMENTS

| | | |
|---|---|---|
| JP | 2001305210 A | 10/2001 |
| JP | 2004502942 A | 1/2004 |
| JP | 2006524472 A | 10/2006 |
| RU | 2477022 C2 | 2/2013 |
| WO | 0021873 A1 | 4/2000 |
| WO | WO-2010132842 | 11/2010 |

OTHER PUBLICATIONS

"Extended European Search Report", EP Application No. 14787342.6, dated Mar. 7, 2017, 7 pages.

Vaughan-Nichols "How Google—and Everyone Else—Gets Wi-Fi Location Data", Retrieved from <http://www.zdnet.com/blog/networking/how-google-and-everyone-else-gets-wi-fi-location-data/1664> on Aug. 8, 2013, Nov. 16, 2011, 10 pages.

"iOS 5: Understanding Location Services", Retrieved from <http://support.apple.com/kb/ht4995> on Aug. 8, 2013, Oct. 23, 2011, 3 pages.

Myllymaki et al.,"Location Aggregation from Multiple Sources", In Proceedings of the Third International Conference on Mobile Data Management, Jan. 8, 2002, 8 pages.

"Skyhook: How It Works—Overview", Retrieved from <http://www.skyhookwireless.com/howitworks/> on Aug. 8, 2013, Jun. 21, 2011, 2 pages.

Thomson et al.,"Using Device-provided Location-Related Measurements in Location Configuration Protocols", In Internal Draft, Intended Status: Standards Track, Apr. 11, 2013, 70 pages.

Panzarino "What is WiFiSLAM and Why Did Apple Want It?", Retrieved from <http://thenextweb.com/apple/2013/03/26/what-exactly-wifislam-is-and-why-apple-acquired-it/> on Aug. 8, 2013, Mar. 26, 2013, 10 pages.

"Office Action Issued in Australian Patent Application No. 2014332140", dated Jul. 27, 2018, 4 Pages.

"First Office Action and Search Report Issued in Chinese Patent Application No. 201480055700.9", dated Jun. 20, 2018, 11 Pages.

"Office Action Issued in Russian Patent Application No. 2016113355", dated Jul. 17, 2018, 7 Pages.

"Office Action Issued in Japanese Patent Application No. 2016-516908", dated Aug. 14, 2018, 7 Pages.

"Office Action Issued in Mexican Patent Application No. MX/a/2016/004367", dated Jan. 29, 2018, 6 Pages.

Yamada, et al., "An Indoor Positioning System using RFID and Wireless Communication Devices", In Proceedings of the 73rd National Convention of Information Processing Society of Japan, Mar. 2, 2011, 3 Pages.

"Office Action Issued in Mexican Patent Application No. MX/a/2016/004367", dated Oct. 4, 2018, 11 Pages.

* cited by examiner

LOCATION SOURCE RANKING FOR DETERMINING DEVICE LOCATION

BACKGROUND

Today's mobile devices provide users with a tremendous amount of portable functionality. For instance, smartphones, tablets, laptops, and so on, enable users to perform a variety of different tasks without being tied to a particular location. Since a user may move between locations, it can be useful to know where a user is located at a particular time. Consider, for example, that a user encounters an emergency situation. Knowing where the user is located geographically allows the closest available emergency services to be more quickly identified. Once identified, emergency services can be notified of the user's location to enable quick and accurate dispatch of the emergency services to the scene of the emergency situation.

While there are existing ways to determine a user's location based utilizing functionality of their mobile device, these current techniques suffer from a number of deficiencies. For instance, some techniques are inflexible and rely on the availability of information that may be transient, e.g., signals from cell towers for triangulation via communication with cellular base stations. Further, some techniques cannot adapt to changes in the types of location information that may be available at a particular location.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for location source ranking for determining device location are described. A location source generally refers to a source of position information (e.g., GPS coordinates, latitude and longitude, street addresses, and so forth) for different devices. Position information for a client device, for example, can be processed to determine a geographical location of the client device. According to one or more embodiments, location sources and/or combinations of location sources can be ranked based on various criteria. Location sources can be ranked, for example, based on relative precision, accuracy, and/or historical reliability of respective location sources. Thus, when a location is requested for a particular device, a highest ranking available location source or combination of location sources can be selected to determine a location of the device.

In at least some embodiments, location policies can be generated that rank different location sources relative to one another. Location policies, for instance, can be maintained on a client device and/or via a remote location-related service. Further, location policies can specify situations in which location-determination decisions for a client device are to be made at the client device, and/or at a remote service. Thus, in some scenarios a location of a client device can be determined at the client device, and in other scenarios the location of the client device can be determined at a remote service. According to various embodiments, a location of a client device can be determined to enable emergency assistance to be provided at the location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
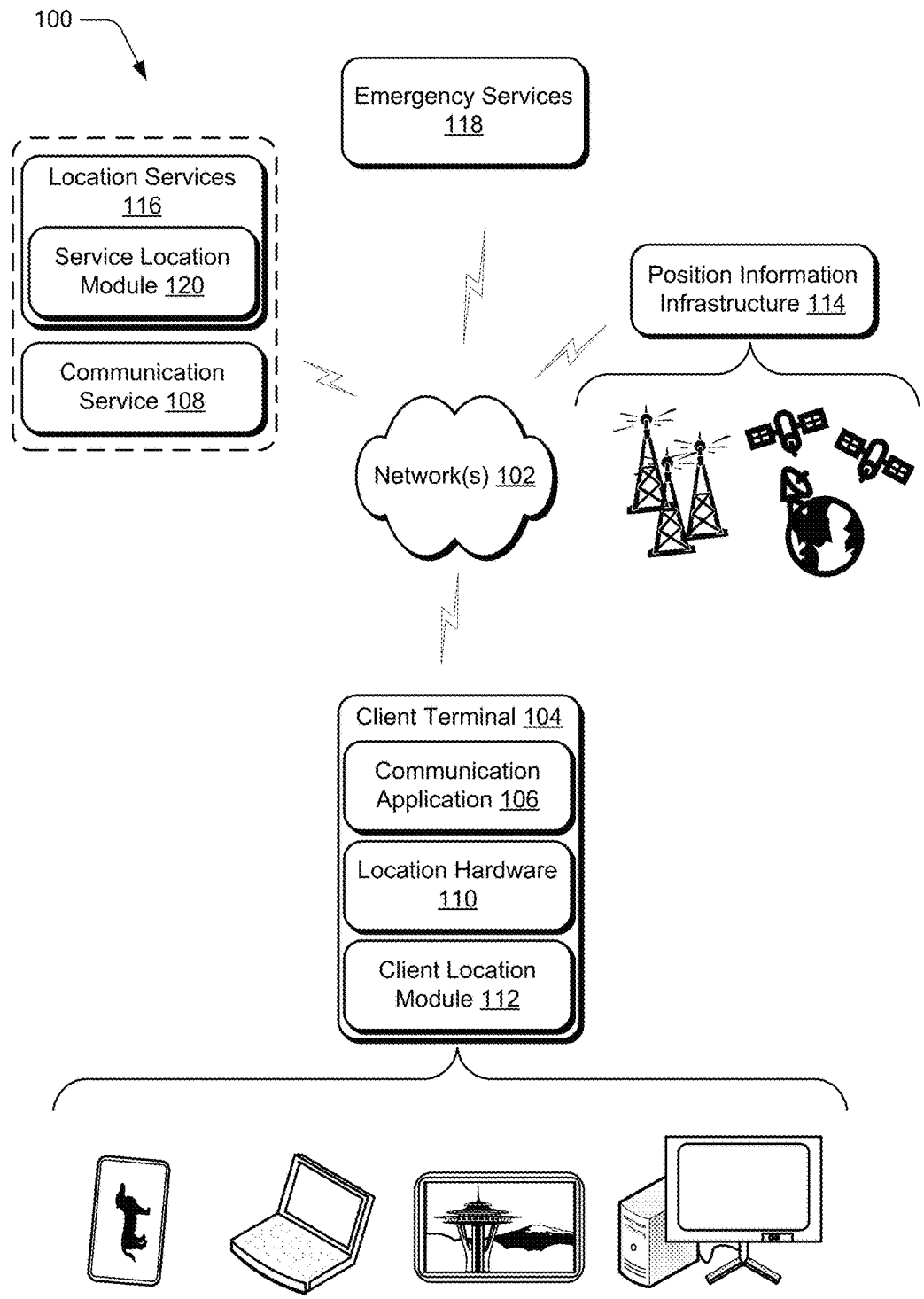
FIG. 1 is an illustration of an environment in an example implementation that is operable to employ techniques discussed herein.

Techniques for location source ranking for determining device location are described. A location source generally refers to a source of position information for devices, such as Global Positioning System (GPS) satellites, cellular communication systems, broadband wireless (e.g., WiFi™) networks, Location Information Servers (LISs), user input of location information, and so forth. Thus, a location source can be leveraged to provide position information for a device, such as a mobile computing device. Examples of position information include GPS coordinates, street addresses, latitude and longitude coordinates, and so forth. Position information for a client device can be processed to determine a geographical location of the client device.

According to one or more embodiments, location sources and/or combinations of location sources can be ranked based on various criteria. Location sources can be ranked, for example, based on relative precision, accuracy, and/or historical reliability of respective location sources. For instance, a location source with a higher known accuracy, such as multiple GPS satellites, can be ranked higher than another location source with lesser known accuracy, such as cellular triangulation. Thus, when a location is requested for a particular device, a highest ranking available location source or combination of location sources can be selected to determine a location of the device.

In at least some embodiments, location policies can be generated that rank different location sources relative to one another. Location policies can be maintained on a client device and/or via a remote location-related service. Further, location policies can specify situations in which location-determination decisions for a client device are to be made at the client device, and/or at a remote service. Thus, in some scenarios a location of a client device can be determined at the client device, and in other scenarios the location of the client device can be determined at a remote service.

Location of a client device can be determined and/or requested in a variety of different scenarios. For instance, device location may be periodically determined such that a current or most recent location of a device is maintained for various purposes. A periodic location query can be performed, for example, such as based on a pre-specified query interval. For instance, techniques discussed herein can be employed to determine a location of a device on a periodic basis, such as every 5 seconds, every 30 seconds, and so forth. Thus, a current or most recent location of a client device can be proactively maintained should the location be requested for various purposes.

Additionally or alternatively, a location of a client device can be determined in response to a specific request. For instance, consider a scenario where a location of a client device is requested as part of a request for emergency assistance. For instance, consider that a user of a mobile device encounters an emergency situation, and utilizes the mobile device to initiate a voice call requesting emergency assistance. The user, for example, can utilize a communication application (e.g., a Voice over Internet Protocol (VoIP) client) on the mobile device to initiate the call. In response to the emergency call, a request for a location of the mobile device is automatically generated. The request, for instance, is generated by the communication application, a communication service (e.g., a VoIP service), a remote location service, and so forth.

In response to the request, available location sources for the mobile device are identified. For instance, a number of GPS satellites with signal can be determined, a number of cellular base stations, location services (e.g., LISs), broadband networks (e.g., wireless and/or wired), and so forth. The available location sources are compared to location polices for the mobile device. The location policies, for example, can be applied by the mobile device and/or a remote service in communication with the mobile device. The location policies specify, among other things, a ranking of different types and/or combinations of location sources. Thus, the available location sources are compared to location policies to select a highest ranking location source and/or combination of location sources that is available. Position information from the selected location source(s) is retrieved to determine a location of the mobile device.

The location of the mobile device is used to locate emergency services to provide emergency assistance. For instance, the closest emergency center (e.g., emergency services, emergency dispatcher, and so forth) to the mobile device's location can be identified. The identified emergency center is notified of the emergency situation, and provided with the location of the mobile device. Thus, the emergency center can provide and/or dispatch emergency services to the location to provide emergency assistance.

Techniques discussed herein may be leveraged to determine device location in a variety of different scenarios and for a variety of different purposes. Device location, for instance, may be determined to location and route emergency services, for publishing presence and/or location information for a user of a device, for optimizing call routing, user tracking, locating local enterprise services, and so forth. These scenarios are presented for purpose of example only, and device location may be determined for a variety of different purposes and in a variety of different scenarios not specifically discussed herein.

In the following discussion, an example environment is first described that is operable to employ techniques described herein. Next, a section entitled "Location Source Preferences" describes some example ways for specifying preferences and rankings of location sources in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for location source ranking for determining device location described herein. The environment 100 includes a communication network 102, which is representative of different connected components that exchange, process, and/or route data to enable different forms of communication. Examples of the network 102 include a local access network (LAN), wide area network (WAN), the Internet, and so forth.

Connected to the network 102 is a client terminal 104, which is representative of an end-user device configured to communicate via the network 102. The client terminal 104 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), and so forth.

The client terminal 104 includes a communication application 106, which is representative of functionality to enable different forms of communication via the client terminal 104. Examples of the communication application 106 include a voice communication application (e.g., a VoIP client), a video communication application, a messaging application, a content sharing application, and combinations thereof. The communication application 106, for instance, enables different communication modalities to be combined to provide diverse communication scenarios. In at least some embodiments, the communication application 106 represents an application that is installed on the client terminal 104. Additionally or alternatively, the communication application 106 can be implemented all or in part as a remote application, such as accessed via a web browser, a web application, and so forth.

According to various embodiments, the communication application 106 is configured to enable various types of communication via interaction with a communication service 108. The communication service 108 is representative of a service to perform various tasks for management of communication between the client terminal 104 and other entities, e.g., other client terminals. The communication service 108, for instance, can manage initiation, moderation, and termination of communication sessions for the client terminal 104. Examples of the communication service 108 include a VoIP service, an online conferencing service, a unified communications and collaboration (UC&C) service, and so forth. In at least some embodiments, the communication service 108 may be implemented as or be connected to a private branch exchange (PBX) in communication with a Public Switched Telephone Network ("PSTN") to enable voice communication between the client terminal 104 and other devices.

The client terminal 104 further includes location hardware 110 and a client location module 112. The location hardware 110 is representative of various types of hardware for receiving, transmitting, and/or processing location information. The location hardware 110, for instance, supports transmission, reception, and processing of position information according to a variety of different technologies, such as GPS, cellular communication, WiFi™, satellite communication, radio frequency (RF) communication, and so forth.

The client location module 112 is representative of functionality for performing various aspects of techniques for location source ranking for determining device location discussed herein. For instance, the client location module 112 can receive location information from the location hardware 110 and process the location information in various ways to determine a location of the client terminal 104. In at least some embodiments, the client location module 112 may also receive location information from different software functionalities, such as an operating system, a location-related plug-in module, a location provider service, and so forth. For instance, an operating system for the client terminal 104 may provide subnet, Ethernet switch and/or port information, and so forth, that can be leveraged by the client location module 112 to determine an approximate location of the client terminal 104. The client location module 112 may also cause location information to be transmitted from the client terminal 104 to a remote resource for processing to determine a location of the client terminal 104.

According to various embodiments, the location hardware 110 can communicate with a position information infrastructure 114 to obtain position information for the client terminal 104. The position information infrastructure 114 is representative of various types of position information systems that can transmit and/or receive position information. Examples of the position information infrastructure 114 include GPS satellites, cellular telephone networks, wireless data (e.g., WiFi™) networks, radio frequency identifier (RFID) functionality, and so forth. Position information, for example, can be communicated between the location hardware 110 and the position information infrastructure 114 to enable a location of the client terminal 104 to be determined. Examples of position information include GPS coordinates, street addresses, network location, location with reference to a cell tower and/or set of cell towers, and so forth.

The environment 100 also includes location services 116 and emergency services 118. The location services 116 are representative of functionality to perform various location determination tasks. For instance, the location services 116 include hardware and logic (e.g., servers) that are remote from the client terminal 104 and that can communicate with the client terminal via the network 102. The location services 116, for instance, can receive location information from the client terminal 104, and process the location information to determine a location of the client terminal 104. An example implementation of the location services 116 includes a Location Information Service (LIS). The location services 116 include a service location module 120, which is representative of functionality to perform various aspects of techniques for location source ranking for determining device location described herein.

In at least some embodiments, the location services 116 can be implemented by and/or as part of the communication services 108. Alternatively, the location services 116 can be implemented as a standalone service.

The emergency services 118 are representative of various entities that dispatch and/or provide emergency assistance. Examples of the emergency services 118 include an emergency services operator (e.g., a 911 operator), law enforcement, emergency medical services, firefighting services, and so forth.

As an example implementation of techniques for location source ranking for determining device location discussed herein, consider that the client terminal 104 is a mobile device such as a smartphone. A user in possession of the client terminal 104 becomes involved in an emergency situation, such as an automobile accident. The user initiates a voice call via the communication application 106 and/or the communication services 108 to request emergency assistance.

In response to the request for emergency assistance, the communication application 106 initiates a request for a location of the client terminal 104. In response, position information (e.g., GPS coordinates) is retrieved by the client terminal 104 via the position information infrastructure 114. Functionality of the client location module 112 and/or the service location module 120 is leveraged to process the position information to determine a location of the client terminal 104 utilizing aspects of techniques for location source ranking for determining device location discussed herein. Based on the user's location, the appropriate emergency service 118 is identified. For instance, the closest emergency services 118 (e.g., emergency dispatch center) to the user's location can be identified. Once a suitable (e.g., closest) emergency service is identified, the identified emergency service 118 is then notified of the emergency situation and of the user's location. Thus, the emergency service 118 is dispatched to the user's location to provide emergency assistance to the user and/or other person at the user's location.

Alternatively or additionally to determining a location of the client terminal 104 in response to the request for emergency assistance, the location may be pre-determined prior to the request. As referenced above, for instance, the client terminal 104 and/or the location service 116 may periodically and/or occasionally update a location of the client terminal 104. Thus, a current and/or most recent location of the client terminal 104 can be consistently maintained and available. Accordingly, if the location is requested for a specific purpose (e.g., emergency assistance), the pre-determined location can be provided without performing further location-determination procedures.

Various other functionalities and implementation details concerning the different entities of the environment 100 are discussed below.

Having described an example environment in which the techniques described herein may operate, consider now some example implementation scenarios for location source ranking for determining device location in accordance with one or more embodiments.

Location Source Preferences

According to various embodiments, location policies can be defined to specify preferences for location sources. Generally, a location source refers to a particular source or combination of sources of position information. For instance, a particular location policy can rank different location sources in order of preference. Preferences, for example, can be based on relative accuracy of different location information sources. In a given scenario where location information is requested, available location sources can be compared to the policy ranking to determine which source or combination of sources to utilize to ascertain location information.

As an example, consider the following location source policy that ranks various location sources in descending order of preference. In at least some embodiments, the policy represents a client-side policy (e.g., for the client terminal 104) and/or a server-side policy, e.g., for the location services 116. The policy, for example, can be maintained by the communication application 106, the client location module 112, and the service location module 120. This policy is presented for purpose of example only, and a wide variety of different policies and rankings can be employed in accordance with various embodiments.

(1) GPS/Assisted GPS (A-GPS): 4 satellites. This location source generally refers to signal being received from 4 GPS satellites, and is considered to have a high degree of accuracy and is thus preferred.

(2) Three equally weighted location sources:
   a. Cellular: 3 cellular base stations that are separable from one another. This location source generally refers to signal being received from 3 or more base stations (e.g., towers) in a cellular network for which there is sufficient angle discrimination between the base stations such that the positions of base stations can be differentiated.
   b. Broadband signal source: Commercial Internet signal source, such as an Internet Service Provider (ISP) that provides Internet connectivity to a client device. For instance, this location source can include a WiFi™ and/or other wireless data source.
   c. Enterprise Network: An enterprise (e.g., workplace) network to which a client device is connected.

(3) GPS/Assisted GPS (A-GPS): 3 satellites. This location source generally refers to signal being received from 3 GPS satellites.

(4) Cellular: Less than 3 base stations, or 3 or more base stations that do not have sufficient angle discrimination between the base stations such that the positions of base stations can be differentiated.

(5) Public Location Service: A location service that may be openly accessed, e.g., by any requesting device without requiring a user account and/or authentication.

(6) User-Provided Location: User input of location information, such as address, GPS coordinates, and so forth.

(7) GPS/A-GPS: 2 Satellites.

These example location sources and rankings are presented for purpose of example only, and a variety of other location sources and/or location source rankings/weightings may be employed in accordance with one or more embodiments. Rankings of location sources, for example, can change based on attributes of available location sources. Location source rankings may also be user and/or administrator configurable to provide customized location source rankings.

In at least some embodiments, location sources can be combined to improve the accuracy of a location determination. For instance, GPS readings for a client device can be combined with cellular triangulation data in an attempt to ascertain with greater accuracy the geographic location of the client device. For instance, consider the following example scenario.

Figure 2:
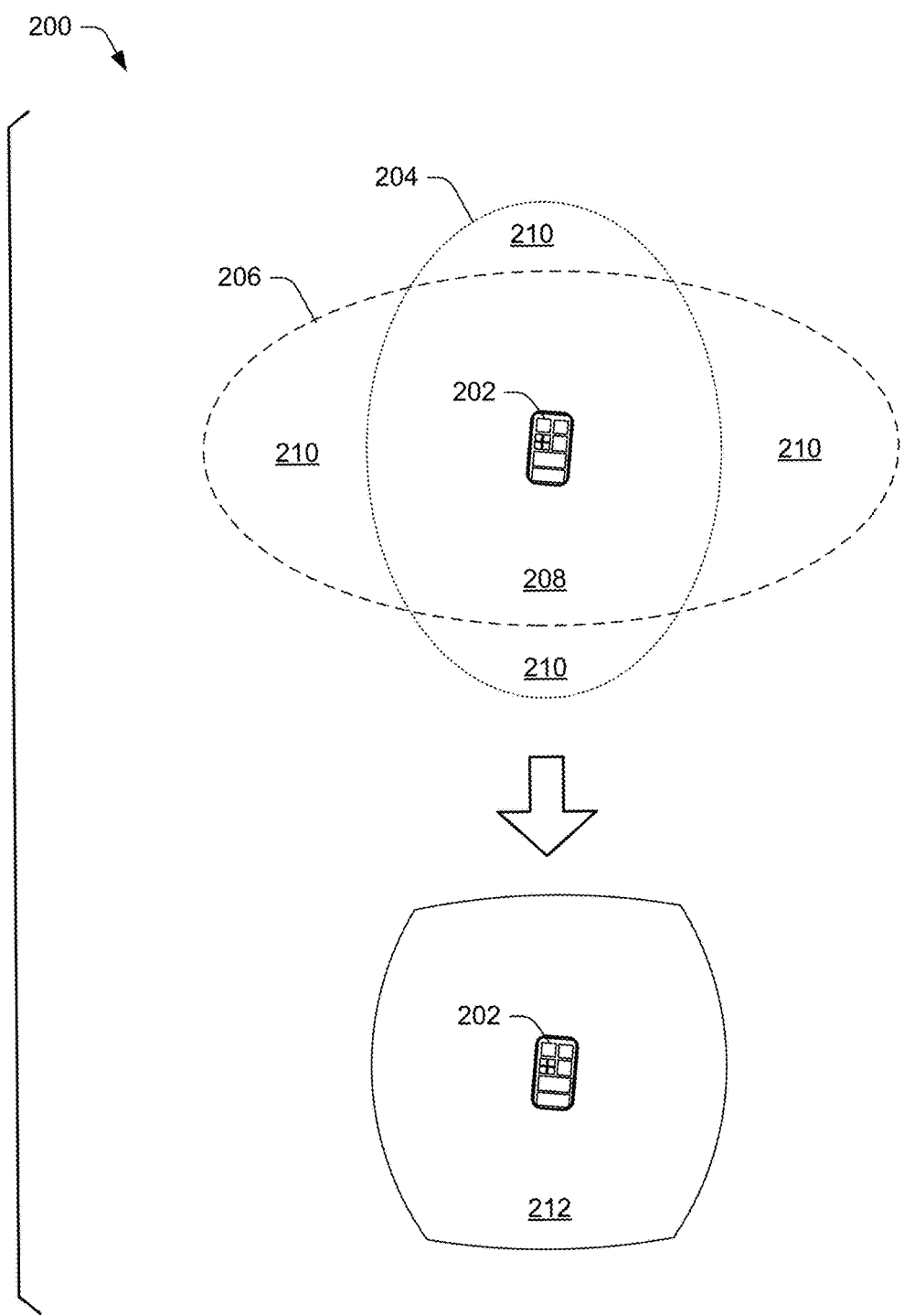
FIG. 2 illustrates an example implementation scenario in accordance with one or more embodiments.

FIG. 2 illustrates an example implementation scenario 200. The scenario 200 includes a client terminal 202, which is representative of an implementation of the client terminal 104 introduced above. Further to the scenario 200, a request for a location of the client terminal 202 is received, such as part of a request for emergency assistance. The request, for instance, can be generated by the communication application 106 as part of an emergency or other type of call made using the communication application 106.

Responsive to the request, cellular triangulation information is gathered for the client terminal 202. The cellular triangulation information provides a triangulation approximation zone 204, which represents an approximate geographic location for the client terminal including a margin of error associated with the triangulation. Thus, the triangulation approximation zone 204 is based on signals received at multiple cellular base stations from the client terminal 202.

Further to the scenario 200, GPS data for the client terminal 202 is used to generate a GPS approximation zone 206. According to various embodiments, the GPS approximation zone 206 represents an approximation of a geographical location of the client terminal 202. Thus, the triangulation approximation zone 204 and the GPS approximation zone 206 represent distinct geographical zones in which the client terminal 202 is determined to be located at a particular time. In at least some embodiments, the triangulation approximation zone 204 and the GPS approximation zone 206 are captured concurrently and/or within a particular time period of each other, e.g., 2 seconds or less.

As illustrated, the triangulation approximation zone 204 and the GPS approximation zone 206 include an overlapping area 208 and non-overlapping areas 210, which reflects the differences between the two measurement techniques. According to one or more embodiments, the overlapping area 208 is designated a target zone 212, which represents a geographical area in which the triangulation approximation zone 204 and the GPS approximation zone 206 overlap. The target zone 212, for example, represents geographical coordinates that are common to both the triangulation approximation zone 204 and the GPS approximation zone 206.

In at least some embodiments, the target zone 212 is considered a more accurate approximation of the location of the client terminal 202 than either the triangulation approximation zone 204 or the GPS approximation zone 206 alone. Thus, the target zone 212 is used to specify an actual location of the client terminal 202.

Accordingly, the scenario 200 illustrates an example implementation where multiple location sources can be combined to provide a focused approximation of a location of a client device. Although the scenario 200 utilizes GPS and cellular triangulation, it is to be appreciated that any suitable types of location sources can be combined to determine a location of a client device. Embodiments may also combine more than two location sources, e.g., an overlapping zone for three or more different location sources.

In at least some embodiments, location policies can incorporate combinations of sources into rankings of location sources. For instance, consider the following location policy that ranks location sources in descending order of preference.

(1) Combination of GPS and cellular
(2) GPS alone
(3) Combination of Broadband Source and Cellular
(4) Combination of User Provided Location and Cellular
(5) Cellular Triangulation alone This group of combinations of sources and ranking is presented simply to illustrate that combinations of location sources can be ranked in order of preference. Further, combinations of location sources may ranked relative to individual sources.

Having discussed some example implementations of location source preferences, consider now a discussion of some example procedures in accordance with one or more embodiments.

Example Procedures

The following discussion describes some example procedures for location source ranking for determining device location in accordance with one or more embodiments. The example procedures may be employed in the environment 100 of FIG. 1, the system 1000 of FIG. 10, and/or any other suitable environment. In at least some embodiments, the steps described for the various procedures can be implemented automatically and independent of user interaction. Further, various steps of the procedures may be performed by a client, such as via the communication application 106 of the client terminal Additionally or alternatively, steps may be performed on a server side, such as by the location services 116.

Figure 3:
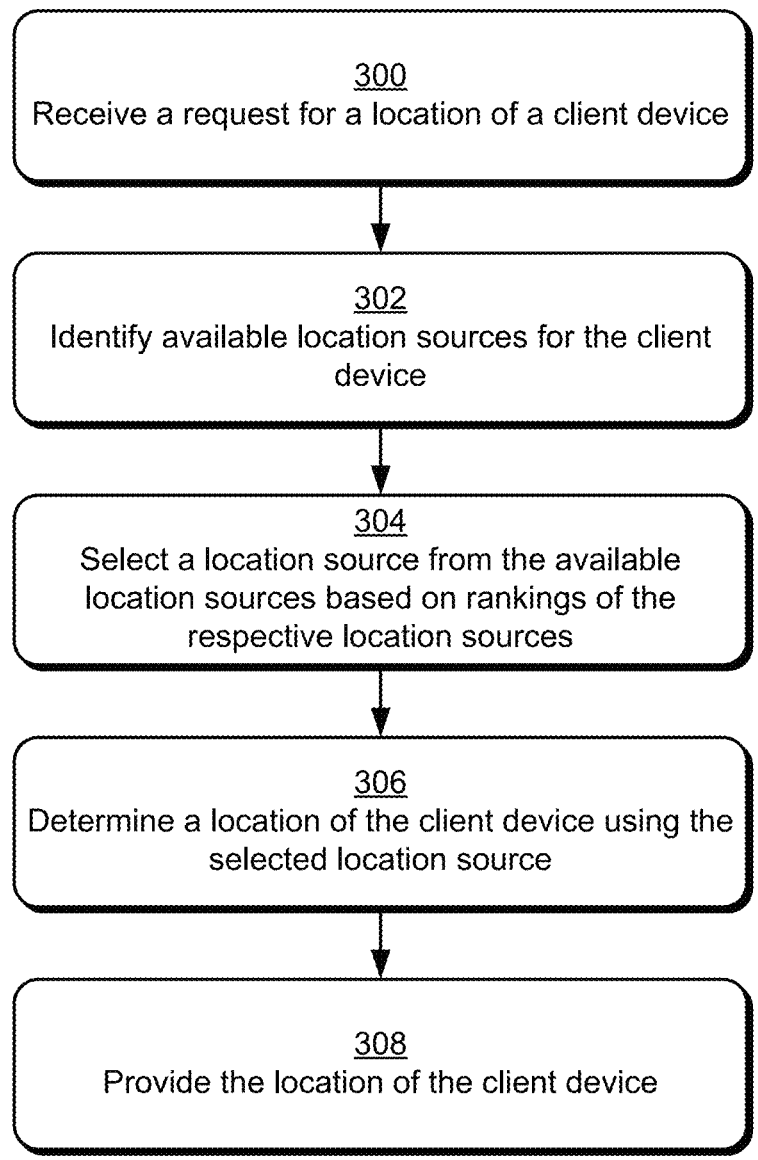
FIG. 3 is a flow diagram that describes steps in a method in accordance with one or more embodiments.

FIG. 3 is a flow diagram that describes steps in a method in accordance with one or more embodiments. Step 300 receives a request for a location of a client device. The location request can be received according to a variety of different scenarios. For instance, the location request can be generated periodically such that a current or most recent location of the client device is maintained by the client device and/or a location service remote from the client device. A user may also expressly request a location of the client device, such as via input to the client device, input to a different computing device, and so forth.

A request for a location of a client device may be requested by a variety of different entities. A client device, for instance, may request its own location, e.g., independent of a query from a different device or service. A remote device and/or service may also request a location of a client device, e.g., independent of a query from the client device.

A location of a client device may also be requested in response to a particular event. The request, for example, can be in response to a request for emergency assistance from a user of the client device. With reference to the environment 100, for example, the client terminal 104 (e.g., the communication application 106) and/or the location service 116 can generate the request. For instance, the request may be generated by the communication application 106 as part of voice call managed by the communication application, such as a call requesting emergency assistance.

Step 302 identifies available location sources for the client device. For instance, signals from different position information systems can be identified, such as GPS signals, signals from cellular base stations, and/or signals from various other location sources, such as those mentioned above. Examples of other position information systems include systems and/or functionalities that utilize network connectivity data. For instance, subnet data, wireless data switch and/or port information, WiFi™ infrastructure data, and so forth, may be utilized in addition and/or alternatively to position information from other position information systems.

Step 304 selects a location source from the available location sources based on rankings of the respective location sources. For instance, the available location sources can be compared to a location policy and the highest ranking source(s) can be selected. An individual source can be selected, and/or a combination of available location sources. Further details concerning selection of location sources are provided above and below.

Step 306 determines a location of the client device using the selected location source. For instance, position measurements from the selected location source and/or combination of selected location sources can be retrieved. The position measurements can be correlated to a geographic location, such as a street address, a set of geographic coordinates, and so forth.

Step 308 provides the location of the client device. The location, for example, can be provided to an entity that requested the location. For instance, in an emergency call situation, the closest emergency services can be identified using the location of the client device. Identified emergency services can be notified of the device's location to enable the emergency services to dispatch emergency assistance to the correct location.

According to various embodiments, a determination as to which location source to use to determine a location of client device can be done at the client device and/or at a remote location. For instance, consider the following example procedure.

Figure 4:
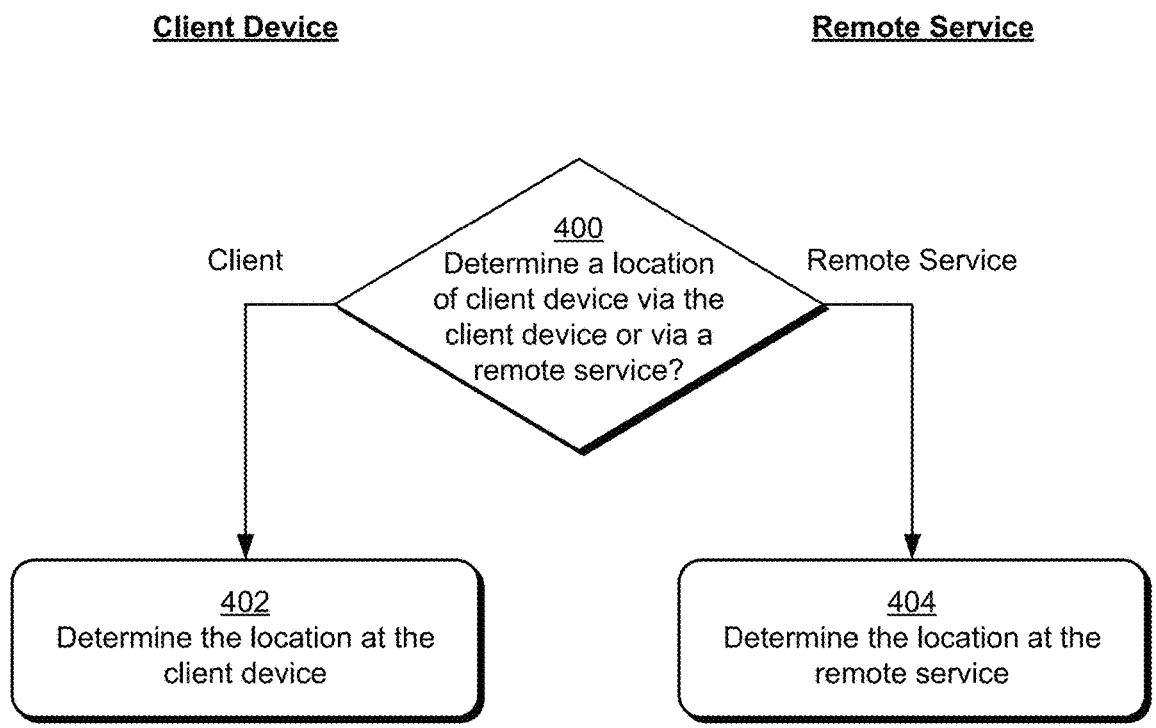
FIG. 4 is a flow diagram that describes steps in a method in accordance with one or more embodiments.

FIG. 4 is a flow diagram that describes steps in a method in accordance with one or more embodiments. Step 400 ascertains whether to determine a location of a client device via the client device or via a remote service. Step 400, for instance, can be performed in response to a request for a location of the client device, such as in response to step 300 discussed with reference to FIG. 3.

According to various embodiments, location policies can be configured to specify when a location for a client device is to be determined at the client device, and when the location is to be determined via a remote service, e.g., the location service 116 discussed above. For instance, a location policy can specify that a location service is to determine the location. Thus, a client device can send position information ascertained by the client device to the location service to be processed to determine a location of the client device.

As another example, a location policy can specify that if client resources are below a specified threshold, the client's location is to be determined by a location service. Examples of such resources include a battery charge level, memory resources, processor resources, and so forth. Thus, in at least some embodiments, if client resources are above a threshold, location determination can occur at the client. Otherwise, location determination can be performed via a remote location service.

As yet another example, a location policy can specify that if a client device has a communication bandwidth limitation (e.g., for wireless bandwidth), location determination is to occur at the client device instead of sending position information to a remote service for processing.

In at least some embodiments, a location policy is user and/or administrator configurable to specify whether location determination is to occur at the client device and/or a remote service. Further, location policy can specify that some portions of location-determination logic are to be performed at a client device, and other portions are to be performed at a remote service.

If the location is to be determined at the client device ("Client"), step 402 determines the location at the client device. For instance, the procedure discussed with reference to FIG. 3 can be performed at the client device.

If the location is to be determined at the remote service ("Remote Service"), step 404 determines the location via the remote service. For instance, the procedure discussed with reference to FIG. 3 can be performed at the remote service. In at least some embodiments, the client device provides position information to the remote service, and the remote service processes the position information to ascertain a location of the client device.

According to one or more embodiments, location determination can occur at both a client device and a location service. For instance, consider the following procedures.

Figure 5:
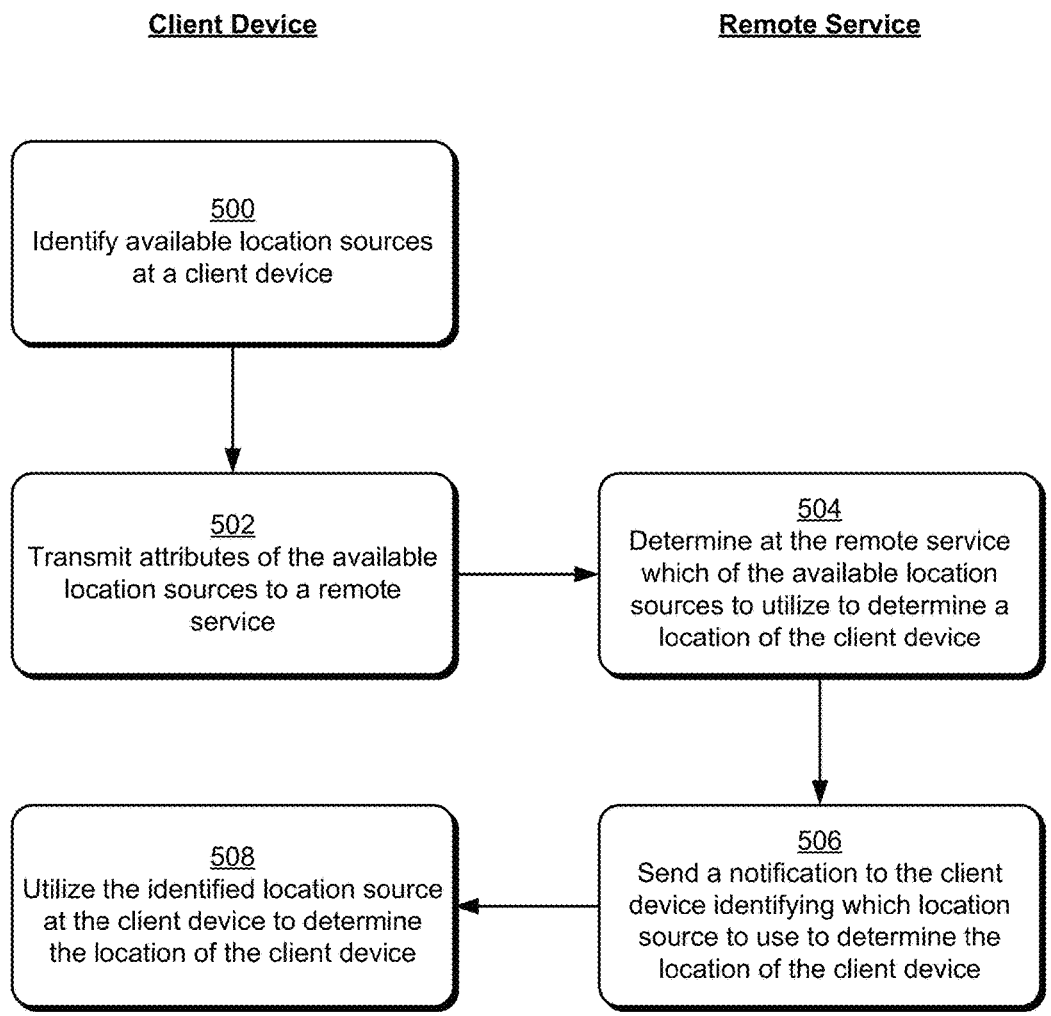
FIG. 5 is a flow diagram that describes steps in a method in accordance with one or more embodiments.

FIG. 5 is a flow diagram that describes steps in a method in accordance with one or more embodiments. Step 500 identifies available location sources at a client device. The client device, for example, can identify types and attributes of location sources that are currently available. For instance, the client device can identify a number of satellites (e.g., GPS satellites) from which the client device is currently receiving signal, a signal strength from different position information systems (e.g., signal from satellites, signal between the client device and cellular base stations, signal from WiFi™ base stations, and so forth), signal-to-noise (S/N) ratio for signal from different position information systems, and so forth.

Step 502 transmits attributes of the available location sources to a remote service. With reference to the environment 100, for example, the client terminal 104 can transmit types and attributes of available location sources (e.g., from the position information infrastructure 114) to the location service 116. Examples of such types and attributes are discussed above.

Step 504 determines at the remote service which of the available location sources to utilize to determine a location of the client device. The remote service, for example, can compare the types and attributes of the available location sources to location policies that specify rankings of different location sources. The highest ranking location source(s) can be selected.

In at least some embodiments, the quality (e.g., signal quality) of a particular location source can be considered in determining whether to use position information from the location source to determine a location of a client device. For instance, if a signal strength and/or S/N ratio for a location source falls below a signal strength threshold, the location source can be demoted in ranking and/or ignored in determination which location source to use.

Step 506 sends a notification to the client device identifying which location source to use to determine the location of the client device. The remote service, for instance, can send a notification to the client device identifying which of the location sources to utilize.

Step 508 utilizes the identified location source at the client device to determine the location of the client device. The client device, for example, can retrieve position information from the identified location source(s), and utilize the position information to ascertain a location of the client device.

Thus, in at least some embodiments decisions at which location source(s) to utilize can occur at a remote service. Logic for processing position information from a selected location source and determining a client device location can be executed at the client device. Alternatively, a client device can select a location source, and can transmit position information from the location source to a remote service. The remote service can process the position information to determine a location of the client device.

Figure 6:
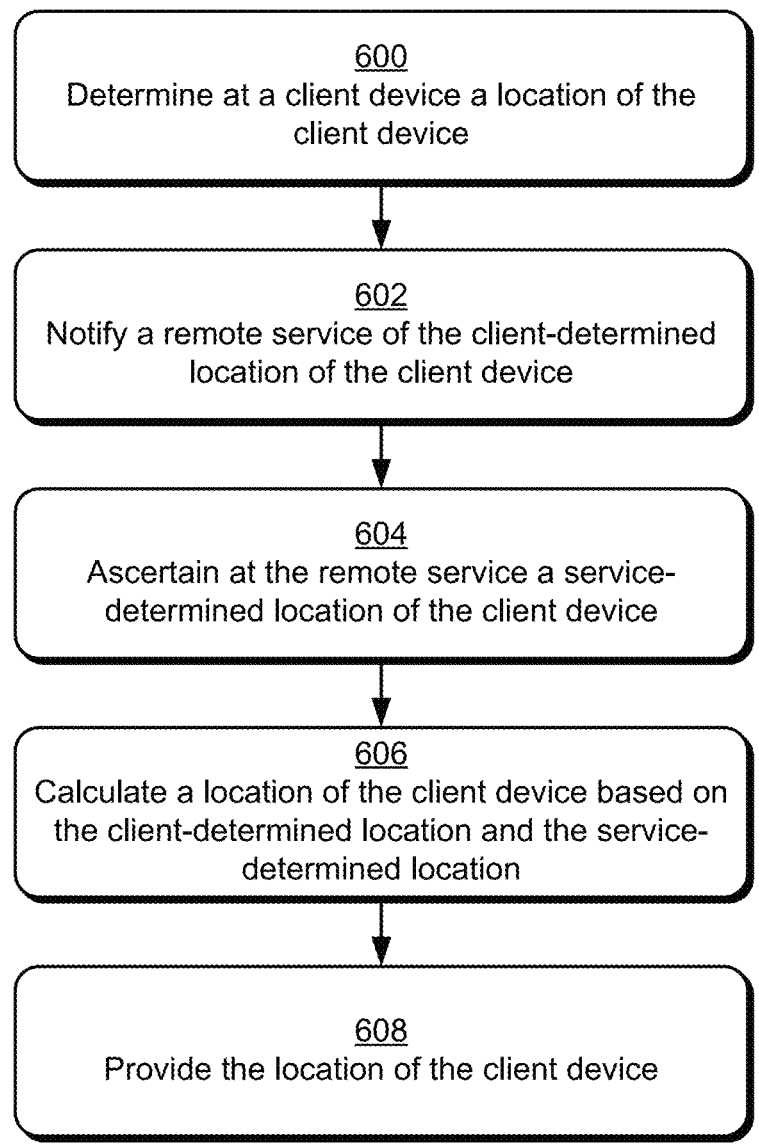
FIG. 6 is a flow diagram that describes steps in a method in accordance with one or more embodiments.

FIG. 6 is a flow diagram that describes steps in a method in accordance with one or more embodiments. Step 600 determines at a client device a location of the client device. For instance, utilize position information from one or more location sources to determine a location of the client device. The location sources can be selected based on location policies applied at the client device and/or a remote service.

Step 602 notifies a remote service of the client-determined location of the client device. The client device, for example, can transmit information about the client-determined location, such as a street address, GPS coordinates, and so forth. The client device may also send raw position information for the client device ascertained from one or more location sources.

Step 604 ascertains at the remote service a service-determined location of the client device. For instance, the remote service can process raw position information received from the client device and/or other resource to determine a location of the client device. Examples of raw position information include GPS coordinates, subnet information, Ethernet switch and/or port data, WiFi™ information (e.g., a Basic Service Set Identifier (BSSID) for a connected wireless network), and so forth. Thus, a variety of different types and/or combinations of position information can be leveraged to determine a location of a client device.

Step 606 calculates a location of the client device based on the client-determined location and the service-determined location. For instance, the client-determined location and the service-determined location can be overlaid, and an overlapping region of the client-determined location and the service-determined location can be determined to be a location of the client device. In at least some embodiments, the client-determined location can be based on a first location source and/or combination of location sources (e.g., GPS, user-specified location, and so on), and the service-determined location can be based on a second, different location source and/or combination of location sources, e.g., cellular triangulation, information from a LIS, and so forth.

Step 608 provides the location of the client device. The location, for instance, can be provided by the remote service to the client device itself and/or to another requesting entity. In at least some embodiments, the location provided by the remote service may override and/or have precedence over a location determined by the client device.

In at least some embodiments, multiple location sources can be combined to determine an overall location of a client device. For instance, consider the follow example procedure.

Figure 7:
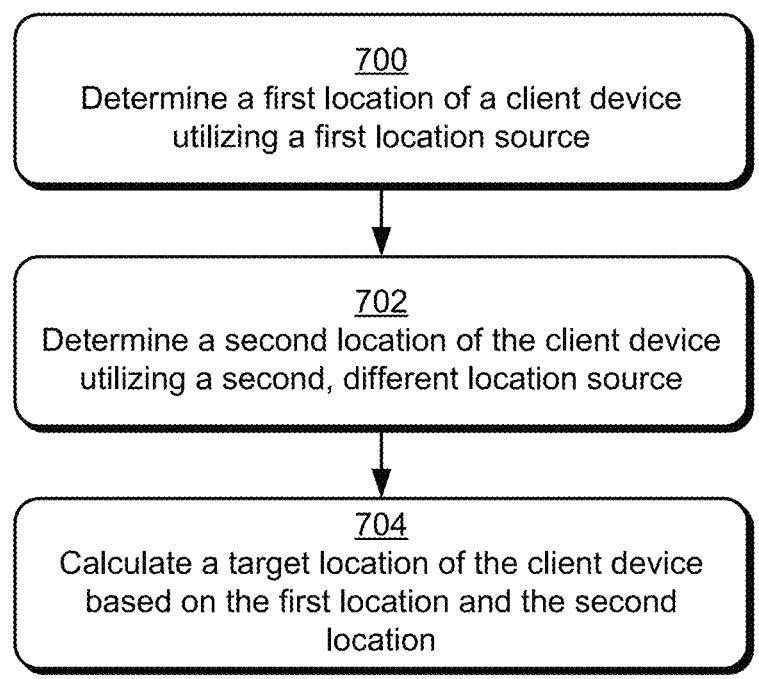
FIG. 7 is a flow diagram that describes steps in a method in accordance with one or more embodiments.

FIG. 7 is a flow diagram that describes steps in a method in accordance with one or more embodiments. Step 700 determines a first location of a client device utilizing a first location source. Examples of different location sources are discussed above.

Step 702 determines a second location of the client device utilizing a second, different location source. As discussed above with reference to FIG. 2, the first location and the second location may include some overlapping portions and some non-overlapping portions.

Step 704 calculates a target location of the client device based on the first location and the second location. For instance, overlapping portions of the first location and the second location can be identified as a target location of the client device. As referenced above, the target portion can correspond to common geographic coordinates between the first location and the second location, a common street address between the first location and the second location, and so forth. Thus, in at least some embodiments, the target location can be considered a more accurate location of the client device than either the first location or the second location individually.

According to one or more embodiments, when multiple location sources are used to determine a location of a client device, the multiple location sources can be selected based on their ranking in a location policy. For instance, the top N ranked location sources (where N=2, 3, . . . , n) in a location policy and/or group of location policies can be selected and combined to determine an overall target location of a client device.

In at least some embodiments, a location service can determine a location of a client device based on network information received from the client device. For instance, consider the following example procedure.

Figure 8:
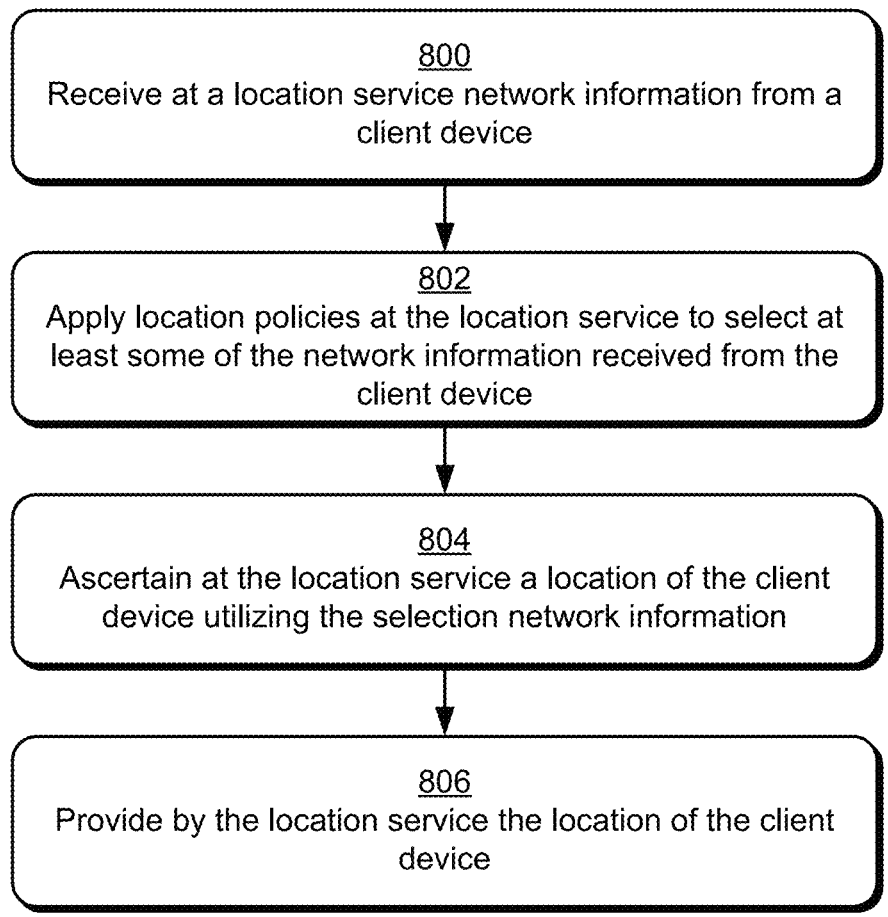
FIG. 8 is a flow diagram that describes steps in a method in accordance with one or more embodiments.

FIG. 8 is a flow diagram that describes steps in a method in accordance with one or more embodiments. Step 800 receives at a location service network information from a client device. The location service 116, for example, can receive various types of network information from the client terminal 104. Examples of the network information include subnet information for network to which the client terminal 104 is connected, Ethernet switch and/or port data for the network, WiFi™ information (e.g., a Basic Service Set Identifier (BSSID) for a connected wireless network), and so forth.

Step 802 applies location policies at the location service to select at least some of the network information received from the client device. For instance, the location policies specify a precedence of location sources, types of location information, and so forth. The location policies may specify a precedence of specific networks, e.g., based on identifiers (e.g., BSSIDs) for the networks. Thus, a particular network and/or combination of networks may be selected to determine a location of the client device.

Step 804 ascertains at the location service a location of the client device utilizing the selection network information. The location service, for example, uses the network information to determine a location of a network to which the client device is connected, and correlates this to a location of the client device.

Step 806 provides by the location service the location of the client device. For instance, the location service can provide the location of the client device to various entities, such as the client device itself and/or other entity.

In at least some embodiments, multiple location services (e.g., LISs) may be considered in certain scenarios in determining a location of a client device. For instance, location policies may rank different location services, such as based on historical reliability and/or accuracy. A particular location service, for example, may have a record of providing a more accurate or less accurate location for a client device than other location services. Thus, in at least some embodiments, location services can be ranked in descending order of preference, with more preferred location services being ranked above less preferred location services. As an example implementation, consider the following example procedure.

Figure 9:
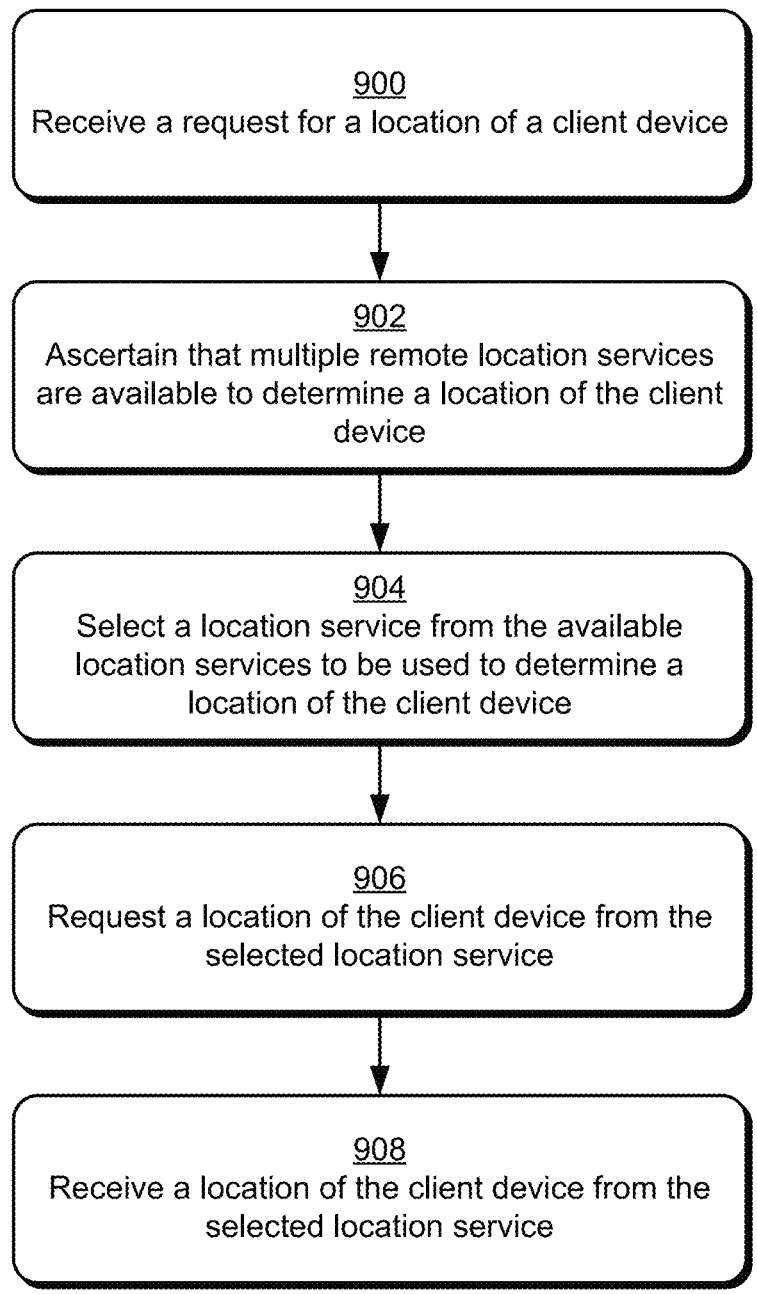
FIG. 9 is a flow diagram that describes steps in a method in accordance with one or more embodiments.

FIG. 9 is a flow diagram that describes steps in a method in accordance with one or more embodiments. Step 900 receives a request for a location of a client device. Example implementations for requesting a location of a client device are discussed above.

Step 902 ascertains that multiple remote location services are available to determine a location of the client device. For instance, with reference to the environment 100 discussed above, multiple of the location services 116 can be available to determine a location of the client terminal 104. At least some of the location services, for example, may be connected to the client device via a network connection. Alternatively or additionally, one or more of the location services may have secondary access to position information for the client device, such as through a different network resource that is connected to the client device.

Step 904 selects a location service from the available location services to be used to determine a location of the client device. The location service(s) can be selected based on a location policy that specifies preferences and/or rankings of location services. For instance, a highest ranking location service or set of location services can be selected.

Step 906 requests a location of the client device from the selected location service. The location, for example, can be requested by various entities, such as the client device itself (e.g., via a communication application), an emergency service, and so forth.

Step 908 receives a location of the client device from the selected location service. For instance, the location can be received as a set of geographic coordinates, a street address, and so on. The location can be received at and/or forwarded to various entities, such as the client device, an emergency service, and so forth.

Having discussed some example procedures, consider now a discussion of an example system and device in accordance with one or more embodiments.

Example System and Device

Figure 10:
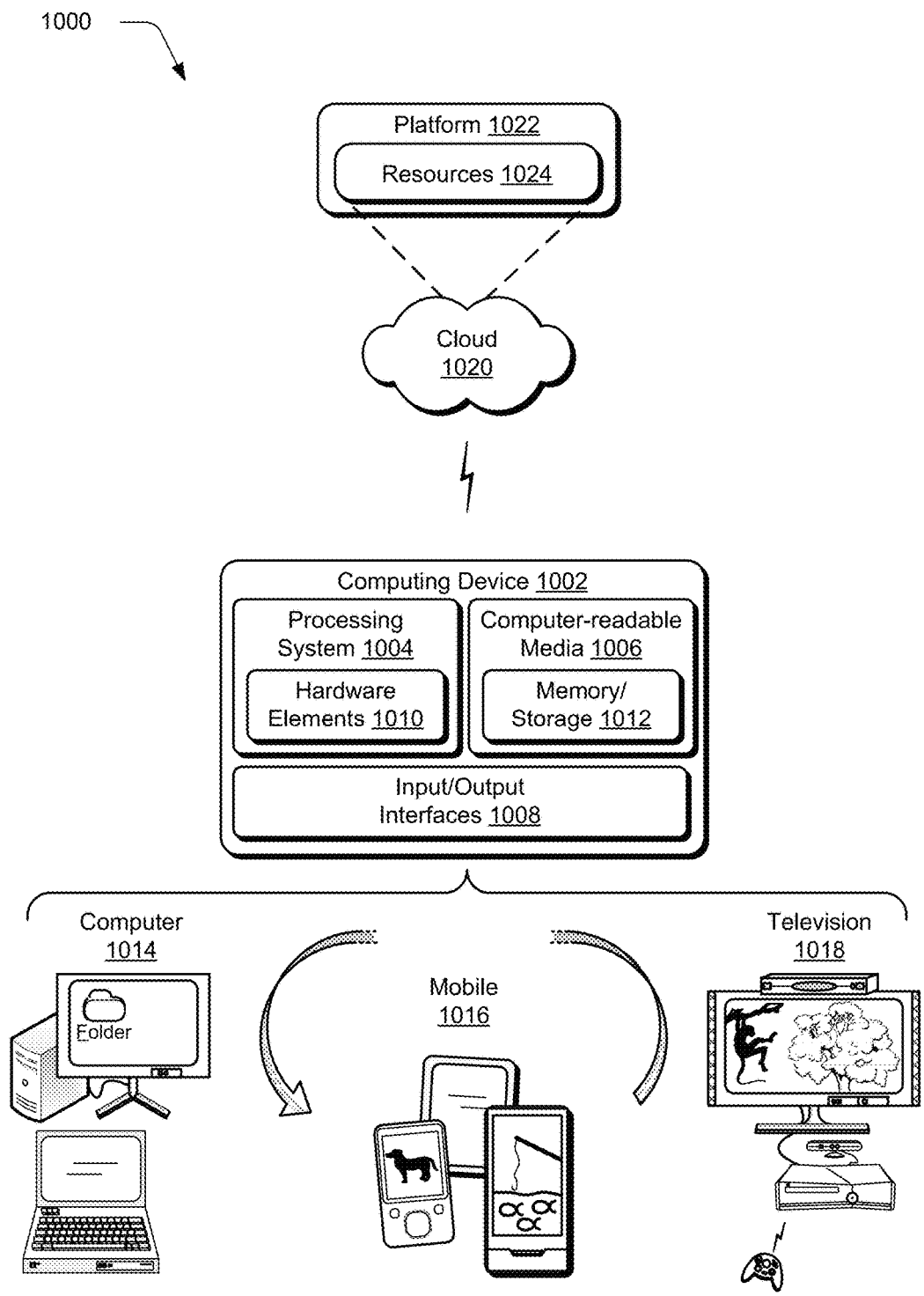
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, the client terminal 104 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to various entities of the environment 100 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for location source ranking for determining device location are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
at least one processor; and
one or more computer-readable storage media including instructions stored thereon that, responsive to execution by the at least one processor, cause the system perform operations including:
receiving a request for a location of a device;
identifying available location sources that are available to provide position information for the device;
selecting a combination of the available location sources based on rankings of the respective available location sources;
defining a target geographic zone for the device by utilizing an overlapping geographic zone and excluding a non-overlapping geographic zone from the combination of the selected available location sources, including:
determining a first location of the device utilizing a first location source of the selected available location sources;
determining a second location of the device utilizing a second, different location source of the selected available location sources; and
defining the target geographic zone using the overlapping geographic zone and excluding the non-overlapping geographic zone from the first location and the second location; and
determining the location of the device using the target geographic zone.

2. A system as recited in claim 1, wherein the request for the location of the device is pursuant to a request for emergency assistance from a user of the device.

3. A system as recited in claim 1, wherein the request for the location of the device is pursuant to one or more of:
a periodic request generated by the device for a location of the device; or
a request from a remote service for a location of the device and independent of a request by the device.

4. A system as recited in claim 1, wherein the available location sources comprise position information systems that are available at a time of the request to provide position information for the device.

5. A system as recited in claim 1, wherein the rankings are specified by one or more of a client location policy or a server location policy.

6. A system as recited in claim 1, wherein the rankings include at least one combination of location sources ranked against at least one individual location source.

7. A system as recited in claim 1, wherein the operations further include:
ascertaining based on one or more location policies whether to determine the location of the device via the device or via a remote service;
in an event that the location is to be determined via the device, performing said determining the location of the device via the device; and
in an event that the location is to be determined via the remote service, performing said determining the location of the device via the remote service.

8. A system as recited in claim 1, wherein said identifying comprises identifying via the device types and attributes of the available location sources, the operations further including:
   transmitting the types and attributes of the available location sources to a remote location service; and
   receiving a notification from the remote location service of which of the available location sources to use to determine the location of the device.

9. A system as recited in claim 1, wherein said determining comprises:
   receiving at a remote service a device-determined location of the device; and
   ascertaining at the remote service a service-determined location of the device, wherein the combination of available location sources comprises the device-determined location and the service-determined location.

10. A system as recited in claim 1, wherein the available location sources include multiple remote location services, and wherein said selecting comprises selecting at least one of the remote location services based on its ranking relative to at least one other of the remote location services.

11. A computer-implemented method, comprising:
   receiving a request for a location of a device;
   ascertaining at a remote location-related service independent from the client device and based on one or more location policies whether to determine the location of the device via the device or via a remote service, wherein the one or more location policies are pre-configured to specify whether to determine the location via the device or via the remote service; and
   determining the location of the device at one of the device or the remote service and utilizing a combination of location sources selected from a ranked set of location sources, said determining including:
      defining a target geographic zone for the location of the device by utilizing an overlapping geographic zone and excluding a non-overlapping geographic zone from the combination of location sources by:
         determining a first location of the device utilizing a first location source of the combination of location sources;
         determining a second location of the device utilizing a second, different location source of the combination of location sources; and
         defining the target geographic zone using the overlapping geographic zone and excluding the non-overlapping geographic zone from the first location and the second location; and
      determining the location of the device using the target geographic zone.

12. A method as described in claim 11, wherein the one or more location policies are pre-configured to specify that if one or more resources of the device are below a specified threshold, the location of the device is to be determine via the remote service.

13. A method as described in claim 12, wherein the one or more resources of the device comprise at least one of a battery charge level, a memory resource, or a processor resource.

14. A method as described in claim 11, wherein the one or more location policies are user configurable to specify whether to determine the location of the device via the device or via the remote service.

15. A method as described in claim 11, wherein the request for the location of the device is pursuant to a request for emergency services, and wherein the method further comprises one or more of:
   identifying an available emergency service based on the location of the device; or
   notifying the available emergency of the location of the device.

16. A method comprising:
   receiving a request for a location of a device;
   identifying location sources that are available to provide position information for the device;
   selecting a combination of the location sources based on rankings of the respective location sources;
   defining a target geographic zone for the location of the device by utilizing an overlapping geographic zone and excluding a non-overlapping geographic zone from the combination of the location sources, including:
      determining a first location of the device utilizing a first location source of the combination of the location sources;
      determining a second location of the device utilizing a second, different location source of the combination of the location sources; and
      defining the target geographic zone using the overlapping geographic zone and excluding the non-overlapping geographic zone from the first location and the second location; and
   determining a location of the device using the target geographic zone.

17. A method as recited in claim 16, wherein the request for the location of the device is pursuant to a request for emergency assistance from the device.

18. A method as recited in claim 16, wherein the request for the location of the device is pursuant to one or more of:
   a periodic request generated by the device for a location of the device; or
   a request from a remote service for a location of the device and independent of a request by the device.

19. A method as recited in claim 16, wherein the rankings include at least one combination of location sources ranked against at least one individual location source.

20. A method as recited in claim 16, further comprising:
   ascertaining based on one or more location policies whether to determine the location of the device via the device or via a remote service;
   in an event that the location is to be determined via the device, performing said determining the location of the device via the device; and
   in an event that the location is to be determined via the remote service, performing said determining the location of the device via the remote service.

* * * * *